Sept. 16, 1952 E. R. DUDLEY, JR 2,610,724
PEACH HALF ORIENTOR

Filed April 4, 1951 3 Sheets-Sheet 1

INVENTOR.
EDMOND R DUDLEY, JR.
BY
ATTORNEYS

Sept. 16, 1952

E. R. DUDLEY, JR 2,610,724

PEACH HALF ORIENTOR

Filed April 4, 1951

INVENTOR.
EDMOND R. DUDLEY, JR

BY

ATTORNEYS

Sept. 16, 1952   E. R. DUDLEY, JR   2,610,724
PEACH HALF ORIENTOR

Filed April 4, 1951   3 Sheets-Sheet 3

INVENTOR.
EDMOND R. DUDLEY, JR.

BY

ATTORNEYS

Patented Sept. 16, 1952

2,610,724

UNITED STATES PATENT OFFICE 2,610,724

PEACH HALF ORIENTOR

Edmond R. Dudley, Jr., Santa Clara, Calif.

Application April 4, 1951, Serial No. 219,236

6 Claims. (Cl. 198—33)

This invention relates to fruit canning machinery and particularly pertains to an orienting machine for orienting halved fruit and delivering the same onto a conveyor belt or the like with the cut face thereof downward.

Heretofore, machines have been in use for the purpose of orienting halved fruit and delivering the fruit at the end of the machine with the cut face thereof downward. These former machines utilized a shaker unit having longitudinally extending open-top, V-shaped troughs extending from the fruit receiving end of the shaker to the discharge end, which troughs were for the purpose of effecting orientation, as described, when the unit was oscillated longitudinally. However, in these prior machines a certain percentage of the fruit would pass through the machine unoriented due to the ineffectiveness of the troughs to effect substantially total orientation of the halved fruit.

It is the principal object of my present invention to improve such prior machines whereby substantial total orientation of halved fruit will be positively obtained therein so that all the halved fruit delivered to one end of the machine will discharge from the other end of the machine with the cut faces downwardly.

One form which the invention may assume is exemplified in the following description and illustrated by way of example in the accompanying drawings, in which.

Figure 1:
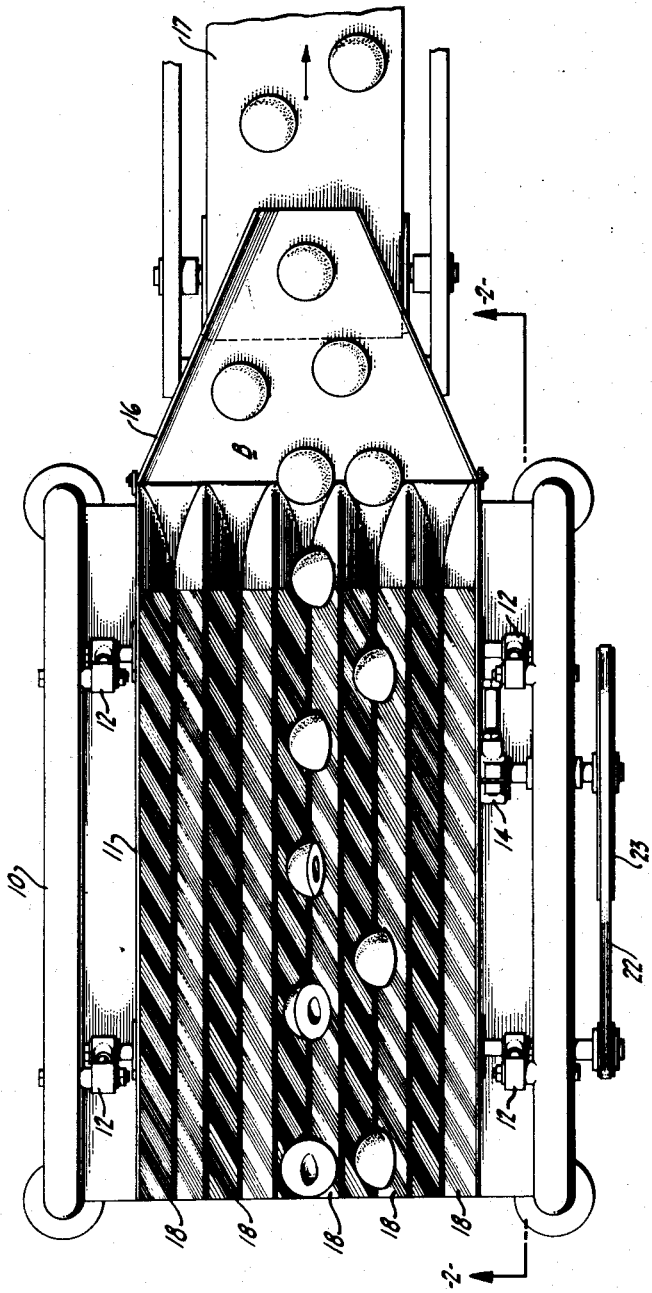
Fig. 1 is a plan view of a machine embodying the preferred form of my invention.
Figure 2:
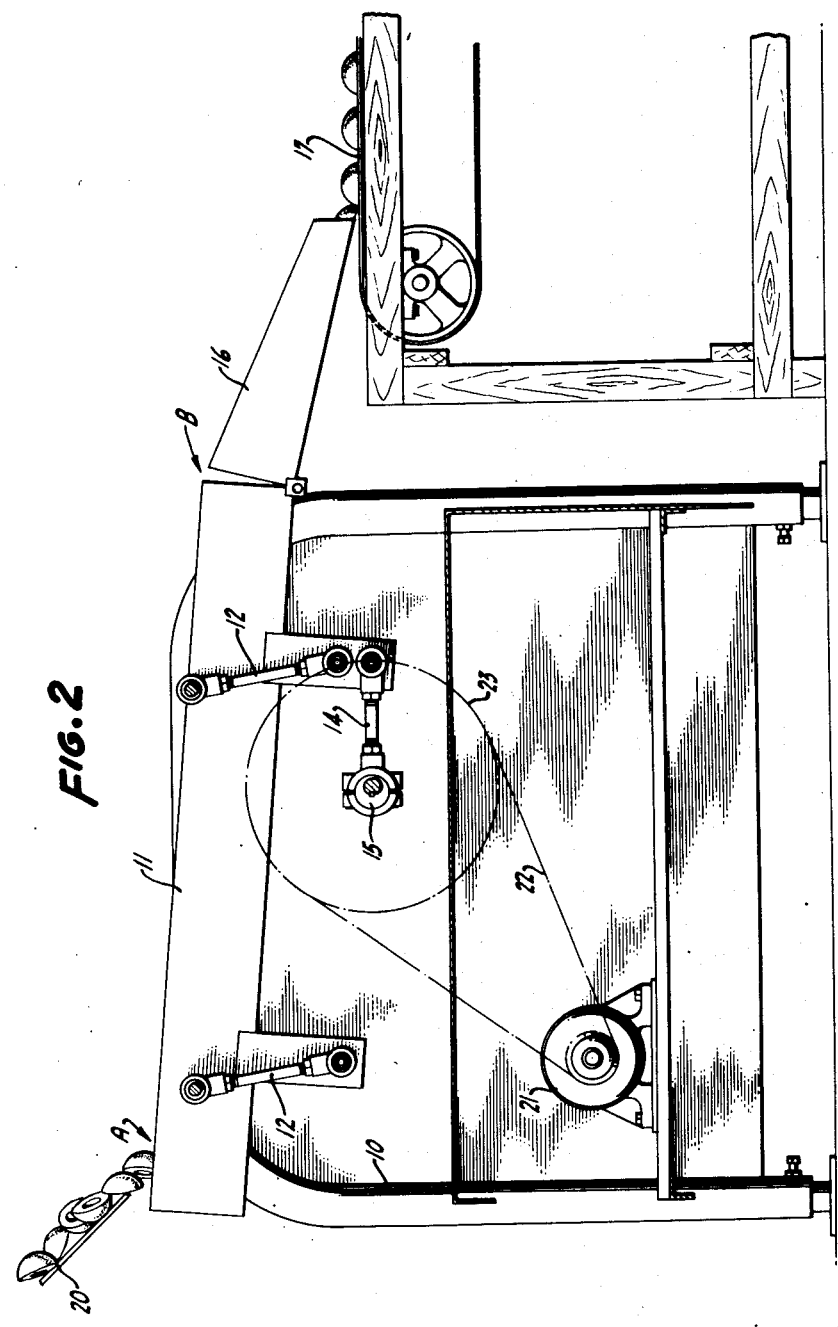
Fig. 2 is a side elevation thereof.

The present machine is primarily for use with fruits such as peaches, apricots, pears, apples and the like, which have been halved, and the purpose of the machine is to receive the halved fruit and orient the same so as to deliver the fruit from the machine with the cut faces downward onto a flat conveyor belt or the like. Machines of this character are useful for various purposes such as the delivery of the fruit to a sorting table and a slicing machine or to a packing table, and it is essential in some operations that the orientation be complete so that all of the fruit is delivered properly oriented. The present machine includes means for positively orienting halved fruit delivered thereto.

Referring more particularly to the drawings, 10 indicates the machine frame on which is mounted the orienting tray 11, which is generally rectangular in form. This tray is mounted adjacent the top of the frame 10 and is supported on the frame by parallel swinging arms 12 with the tray 11 in a slightly inclined position, inclining from its fruit receiving end A to its delivery end B. The support of the tray 11 on the swinging arms 12 enables the tray to be vibrated or oscillated longitudinally during operation by means of a pitman rod 14 actuated by a motor-driven eccentric 15. Thus, hereinafter I will refer herein to the orienting tray 11 as an orienting shaker tray because during operation it is reciprocated or oscillated longitudinally.

At the delivery end B of the shaker tray 11 is an inclined chute 16 having a smooth flat bottom for delivering the fruit from the delivery end B of the shaker tray 11 onto a conveyor belt 17. The fruit will be delivered in a single layer cut face downward onto this belt 17 both for inspection and delivery to a slicing machine or delivery to a point for other operations.

Formed on the orienting shaker tray 11 is a plurality of longitudinal orienting V-shaped orienting channels 18 preferably formed of sheet metal. The open upper end of the channels is of a width greater than the diameter of the fruit which it is desired to orient, and these channels 18 extend from the receiving end A of the orienting tray 11 to the delivery end B thereof. At the latter end, however, the inclined side walls of each orienting channel 18 gradually diverge, as shown in Fig. 1, into a substantially straight condition, as shown. The bottom of the tray, of course, is aligned with the bottom of the chute 16. It is intended that the fruit be oriented completely prior to the time when it reaches the delivery ends of the channels 18, so that the cut faces thereof will bear on the bottom of the tray and slide thereover onto the bottom of the chute 16, and thence onto the conveyor belt 17.

The halved fruit is delivered from a hopper 20 onto the tray 11 at the receiving end A at such a rate relative to the rate at which the fruit passes over the orienting tray 11 that the halved fruit will be delivered in a single layer onto the orienting tray 11.

Figure 3:
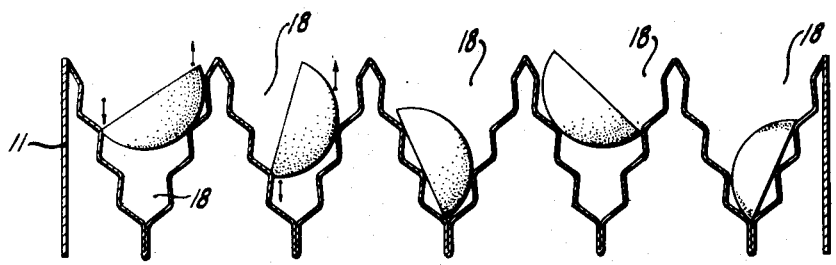
Fig. 3 is a transverse section through the orienting tray of my machine.
Figure 4:
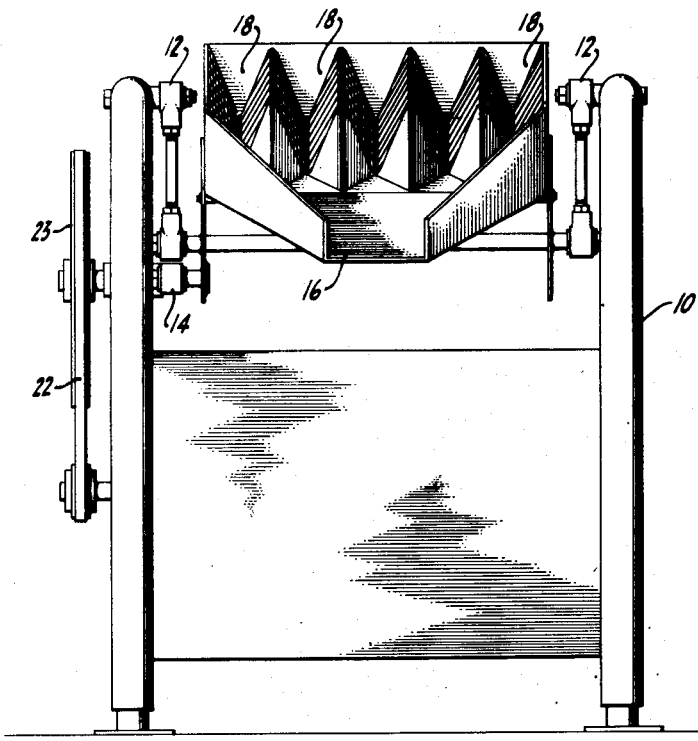
Fig. 4 is an end view of the delivery end of the machine.

For the purpose of positively orienting the fruit so as to deliver it with the cut face thereof downward, the sides of the V-shaped channels are corrugated or undulated, as shown in Fig. 3, with the corrugations or undulations extending at approximately a forty-five degree angle relative to the top and bottom margins of the channels 18. At one side of each channel 18 the corrugations are inclined upwardly and toward the delivery end B of the tray, while at the other side of the channel, the corrugations are inclined upwardly and rearwardly toward the receiving end A of the tray. The corrugations are equally spaced apart and are each angular in cross-section with the angle between the sides of the corrugations being at an obtuse angle, as illustrated.

When the halved fruit is delivered to the receiving end A of the tray, it will deposit therein substantially as shown in Fig. 3 in the first channel at the left thereof and in the fourth channel at the left thereof, and as it progresses through the machine the corrugations cause it to sequentially assume the positions shown in the second and third channels from the left in Fig. 3. It will be seen that in its final position the cut face thereof is so inclined that as the channel walls diverge into straight walls, the halved piece of fruit will, by gravity, assume a position with its cut face downwardly and be delivered in such a condition. Thus, the corrugations in the channels 18 have a positive turning effect on the fruit so as to condition it in a position for discharge, where it will be delivered with the cut face downward.

I have found in actual practice that when the channels 18 are constructed as herein described, the positive turning effect on the fruit halves is such that orientation of fruit halves delivered thereto is complete by the time the fruit reaches the delivery end of the machine.

I wish to point out that while I have disclosed the machine for use in connection with the orientation of peach halves, it is equally applicable for the orientation of apricot, pear, apple and other fruit halves.

In operation of the machine, it is constructed substantially as illustrated and described and the driving motor 21 is placed in operation, which motor, through the medium of a belt 22 and a pulley 23, drives the eccentric 15. This eccentric, through the medium of the pitman rod 14, imparts a longitudinal oscillation to the shaker orienting unit 11 due to the fact that the latter is suspended on the parellel swinging arms 12 carried by the frame 10. The halved fruit is then delivered from the hopper 20 to the receiving end A of the shaker tray 11 at a rate so that the fruit will deposit in a single layer in the channels 18. Due to the inclination of the orienting tray 11 and the shaking action thereof, the fruit will slide longitudinally of the channels 18.

As the halved fruit passes through the channels 18, the corrugations act upon the same, as previously described, so that before the fruit reaches the discharge end B of the tray, it has assumed the position shown in the center channel in Fig. 3, or in the end channel at the extreme right in Fig. 3, in which position the fruit will drop cut face downwardly when it reaches the divergent ends of the channels 18. The fruit will continue to move due to the shaking action and inclination from the shaker 11 over the chute 16 and deposit in a single layer cut face down upon the conveyor 17. From this conveyor it may be delivered to sorting stations, slicing machine or for other operations.

From the foregoing it is obvious that I have provided a very simple but effective machine for orienting halved fruit received thereby so as to deliver the same with the cut face thereof downwardly.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. An orienting machine for halved fruit comprising an orienting tray disposed substantially horizontally for longitudinal reciprocation, said tray having an open V-shaped orienting channel formed longitudinally thereof for receiving the fruit at one end and along which channel the fruit is caused to travel to the other end thereof, the sides of said channel being formed with corrugations extending obliquely to the direction in which said channel extends.

2. An orienting machine for halved fruit comprising an orienting tray disposed substantially horizontally for longitudinal reciprocation, said tray having an open channel formed longitudinally thereof, said channel being substantially V-shaped in cross-section and adapted to receive fruit at one end thereof and permit passage of the fruit longitudinally to the other end thereof, the sides of said channel at said latter end diverging into substantially straight sides, the sides of said channel along the V-shaped portion thereof being formed with corrugations extending obliquely to the direction in which the channels extend.

3. An orienting machine for halved fruit comprising an orienting tray disposed substantially horizontally for longitudinal reciprocation, said tray having an open channel formed longitudinally thereof, said channel being substantially V-shaped in cross-section and adapted to receive fruit at one end thereof and permit passage of the fruit longitudinally to the other end thereof, the sides of said channel at said latter end diverging into substantially straight sides, the sides of said channel along the V-shaped portion thereof being formed with corrugations extending obliquely to the direction in which the channels extend, the corrugations at one side of the channel extending upwardly toward one end of the channel and the corrugations at the opposite side of the channel extending upwardly toward the opposite end of the channel.

4. An orienting machine for halved fruit comprising an orienting tray disposed substantially horizontally but slightly inclined longitudinally, means for reciprocating said tray longitudinally, said tray having a plurality of parallel closely adjacent longitudinally extending V-shaped channels therein for receiving fruit at one end of the tray and along which channels the fruit will pass during reciprocation of the tray, the sides of said chaanels being formed with undulations which extend obliquely to the direction in which the channels extend.

5. An orienting machine for halved fruit comprising an orienting tray disposed substantially horizontally but slightly inclined longitudinally, means for reciprocating said tray longitudinally, said tray having a plurality of parallel closely adjacent longitudinally extending V-shaped channels therein for receiving fruit at one end of the tray and along which channels the fruit will pass during reciprocation of the tray, the sides of said channels at the discharge ends thereof diverging into straight sides, the sides of said channels along the V-shaped portions thereof being formed with flattened V-shaped corrugations extending obliquely to the direction in which the channels extend.

6. An orienting machine for halved fruit comprising an orienting tray disposed substantially horizontally but slightly inclined longitudinally, means for reciprocating said tray longitudinally, said tray having a plurality of parallel closely adjacent longitudinally extending V-shaped channels therein for receiving fruit at one end of the tray and along which channels the fruit will pass during reciprocation of the tray, the sides of said channels at the discharge ends thereof diverging into straight sides, the sides of said channels along the V-shaped portions thereof being formed with flattened V-shaped corrugations extending obliquely to the direction in which the channels extend, the corrugations at one side of each channel extending upwardly from the bottom of the channel toward one end of the tray and the corrugations at the other side of the same channel extending upwardly toward the opposite end of the tray.

EDMOND R. DUDLEY, Jr.

REFERENCES CITED

The following references are of record in the file of this patent:

UNITED STATES PATENTS

| Number | Name | Date |
|---|---|---|
| 1,278,291 | Balwick | Sept. 10, 1918 |
| 2,337,394 | Kok | Dec. 21, 1943 |